(12) United States Patent
Austin et al.

(10) Patent No.: US 8,860,788 B2
(45) Date of Patent: Oct. 14, 2014

(54) IMAGE RECOGNITION

(75) Inventors: James Austin, Driffield (GB); John Mcavoy, York (GB); Julian Young, York (GB); Mark Vernon, North Shields (GB)

(73) Assignee: Cybula Ltd. (GB)

( * ) Notice: Subject to any disclaimer, the term of this patent is extended or adjusted under 35 U.S.C. 154(b) by 507 days.

(21) Appl. No.: 13/121,243

(22) PCT Filed: Sep. 25, 2009

(86) PCT No.: PCT/GB2009/051260
§ 371 (c)(1),
(2), (4) Date: Jun. 13, 2011

(87) PCT Pub. No.: WO2010/035046
PCT Pub. Date: Apr. 1, 2010

(65) Prior Publication Data
US 2011/0261163 A1   Oct. 27, 2011

(30) Foreign Application Priority Data
Sep. 26, 2008   (GB) .................................. 0817647.1

(51) Int. Cl.
G06K 9/00      (2006.01)
H04N 5/232     (2006.01)
H04N 5/225     (2006.01)
G06K 9/46      (2006.01)

(52) U.S. Cl.
CPC ............. *H04N 5/2256* (2013.01); *H04N 5/232* (2013.01)
USPC ............................................... 348/46; 382/15

(58) Field of Classification Search
USPC ............................................................ 348/46
See application file for complete search history.

(56) References Cited

U.S. PATENT DOCUMENTS

| 7,174,033 B2 * | 2/2007 | Yukhin et al. ................. 382/115 |
| 7,912,252 B2 * | 3/2011 | Ren et al. ....................... 382/117 |
| 2008/0075334 A1 * | 3/2008 | Determan et al. ............ 382/117 |
| 2008/0249884 A1 * | 10/2008 | Knowles et al. ................ 705/23 |

FOREIGN PATENT DOCUMENTS

| EP | 0603157 A1 | 6/1994 |
| EP | 1818855 A2 | 8/2007 |
| WO | WO-2005/038700 A1 | 4/2005 |

* cited by examiner

Primary Examiner — Sath V Perungavoor
Assistant Examiner — Howard D Brown, Jr.
(74) Attorney, Agent, or Firm — Barnes & Thornburg LLP

(57) ABSTRACT

A subject (1) is illuminated by a light source (2) and observed by a pair of cameras (3). The outputs of the cameras (3) are input to an image processor (4), operated under the control of a controller (5), which also controls operation of the light source (2). The light source (2) transmits radiation in a frequency range that is limited substantially to a region of increased opacity in the atmospheric transmission spectrum. This may enable the illumination to be quite clearly discriminated, even at relatively great distances and in bright daylight.

8 Claims, 1 Drawing Sheet

IMAGE RECOGNITION

The present invention relates to image recognition and is concerned particularly with providing illumination to facilitate image recognition.

The recognition of images by machine continues to attract considerable interest. Two examples of literature in the art may be found as WO 03/054779 and WO 2005/038700. Both of these are concerned with recognizing natural images and, in particular, human faces. The potential benefits of reliably recognizing human faces for security purposes are self-evident. However, challenges still remain in achieving this.

If a subject is posed in a set position under controlled lighting conditions, then capturing an image of the subject and subsequently recognizing the captured image can be relatively straightforward. However, these preconditions are not very practical for many everyday circumstances. In reality, subjects can be at variable distances from cameras, lighting may vary, the subject may be in clutter (other objects in the scene) and the subject may assume different orientations.

A known way of dealing with different subject orientations is to use a 3D image. This can overcome the orientation problem, as after capture the face can be re-aligned to the front for recognition. To aide the capture of the 3D image it is possible to project a predetermined light pattern on the subject—this is often referred to as "structured light". This can assist considerably in the construction of the 3D image.

Controlled lighting conditions are often a critical factor in capturing images that are reliable for recognition purposes. This often involves both provision of controlled illumination and the exclusion of uncontrolled environmental illumination sources.

There is thus a need for illumination of a subject in such a way that an image can be captured reliably from a distance of the order of say, 3 to 5 meters, both in indoor conditions and in outdoor conditions including bright sunlight, without the projected light being visible by the subject and others.

Preferred embodiments of the present invention aim to provide means and methods for providing such illumination, particularly in the context of recognizing an image—especially a natural image and more especially a 3-D natural image, such as a human face, for example.

According to one aspect of the present invention, there is provided an image capture system comprising illumination means arranged to illuminate a subject and camera means arranged to capture an image of a subject illuminated by the illumination means, wherein the illumination means is arranged to transmit radiation in a frequency range that is limited substantially to at least one region of increased opacity in the atmospheric transmission spectrum.

Said frequency range may be limited substantially to more than one region of increased opacity in the atmospheric transmission spectrum.

Said region of opacity may comprise a region centred on a wavelength of about 770 nanometers.

Said region of opacity may comprise a region centred on a wavelength of about 940 nanometers.

Said region of opacity may comprise a region centred on a wavelength of about 1140 nanometers.

Preferably, said camera means comprises at least one camera arranged to capture the components of a 3D image and the system further comprises an image processor arranged to receive the image from the or each camera and calculate the 3D image from the or each received image.

Preferably, said camera means comprises a pair of cameras.

Preferably, said illumination means is arranged to project a pattern onto a subject.

Preferably, said pattern is a speckle pattern.

Preferably, said illumination means comprises a laser as a source of illumination.

An image capture system as above may further comprise an image processor arranged to receive a captured image from the camera means and compare the captured image with a plurality of stored images.

Such an image capture system may further comprise recognition means arranged to produce recognition data to indicate whether the captured image exceeds a similarity threshold with at least one of the stored images.

The invention also extends to a method of capturing an image, comprising the steps of
illuminating a subject by illumination means; and
capturing by camera means an image of the subject illuminated by the illumination means:
wherein the illumination means transmits radiation in a frequency range that is limited substantially to at least one region of increased opacity in the atmospheric transmission spectrum.

Preferably, such a method is carried out by an image capture system according to any of the preceding aspects of the invention.

Preferably, said subject is at a distance of at least 3 meters from said camera means.

Said subject may be at a distance of at least 5 meters from said camera means.

Preferably, said subject is in an outdoors environment.

Preferably, said subject is in daylight.

Preferably, said subject is a natural subject.

By "natural subject" we mean a subject that is of natural origin, giving rise to a "natural image", in contrast to an image or image data that is generated or synthesised solely by computer or other artificial means, without reference to a natural subject.

Preferably, said subject is a human subject and said image comprises an image of the subject's face.

Preferably, a method as above includes the step of comparing the captured image with a plurality of stored images and producing a recognition result to indicate whether the captured image exceeds a similarity threshold with at least one of the stored images.

For a better understanding of the invention, and to show how embodiments of the same may be carried into effect, reference will now be made, by way of example, to the accompanying diagrammatic drawings, in which.

Figure 1:
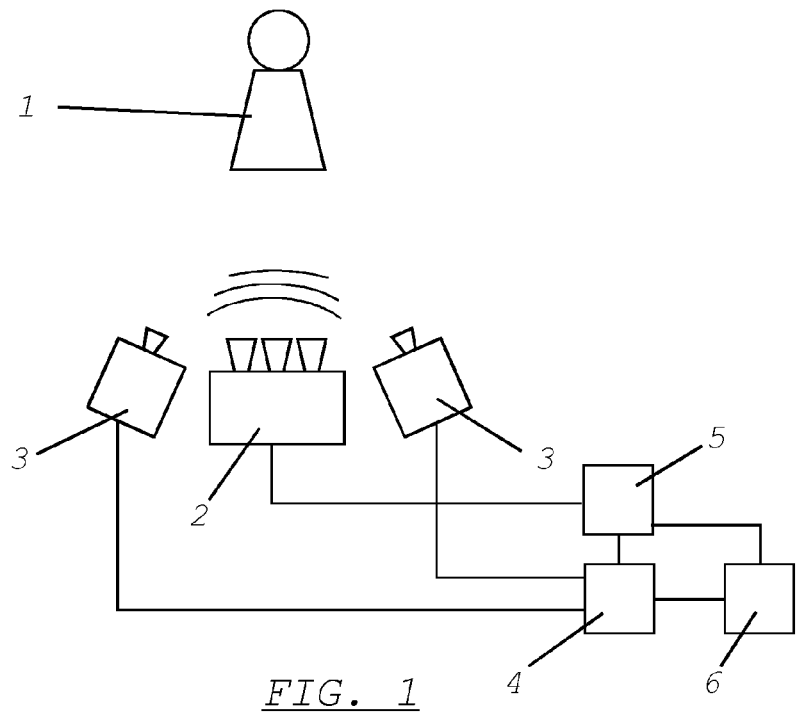
FIG. 1 is a schematic representation of an image recognition system.

In the image recognition system of FIG. 1, a subject 1 is illuminated by a light source 2 and observed by a pair of cameras 3. The outputs of the cameras 3 are input to an image processor 4, operated under the control of a controller 5, which also controls operation of the light source 2. The subject 1 is preferably a human face, which is to be recognised.

The pair of cameras 3 provide the components for a 3D image of the subject 1, the 3D image being formed by the image processor 4 from the images received from the cameras 3. Under control of the controller 5, the image processor 4 is arranged to compare a captured 3-D image with a number of stored images, in order to seek recognition of the captured image. A recognition unit 6 is arranged to produce recognition data to indicate whether the captured image exceeds a similarity threshold with at least one of the stored images. Technology for forming 3-D images and recognizing captured images from a databank of stored images is known from other publications, including those set out above. As such technology is not the particular focus of the present embodiment, it is not described further in detail here.

Instead of a pair of cameras 3, a single camera or more than two cameras may be used.

The focus of the embodiment of FIG. 1 is the way in which the subject 1 is illuminated by the light source 2. In this example, the light source 2 is a coherent light source comprising a laser of wavelength 940 nm and is arranged to project a predetermined pattern (that is, "structured light") on the subject 1. The reason for selecting a wavelength of 940 nm is that this represents a dip in the natural atmospheric transmission spectrum in typical conditions, as shown in FIG. 2.

Figure 2:
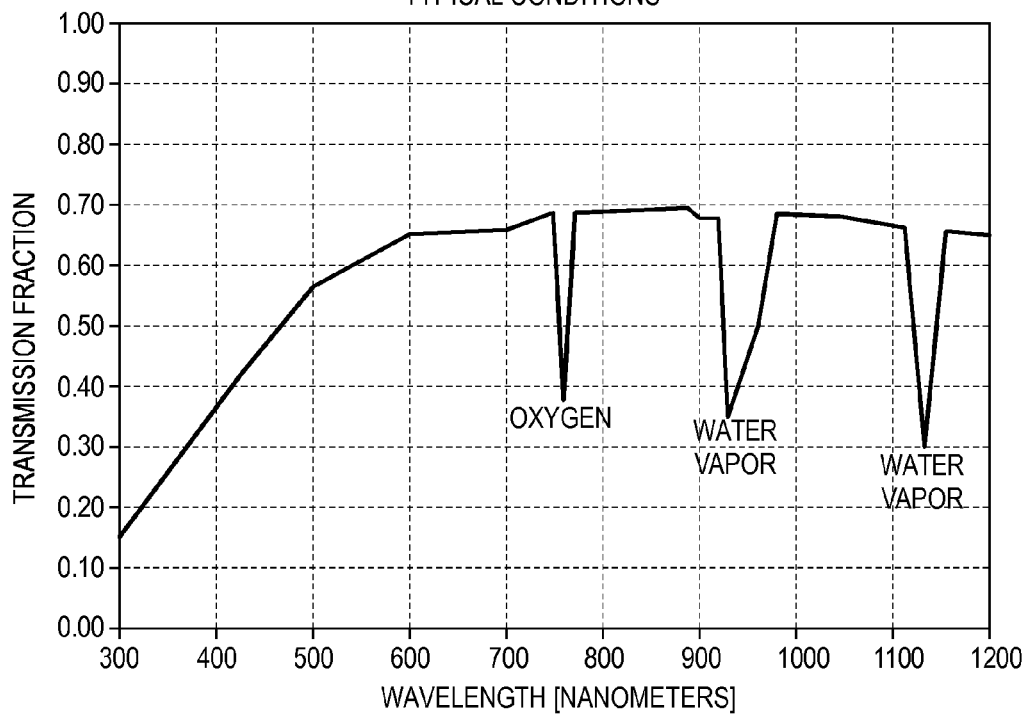
FIG. 2 is a graph that represents a typical atmospheric transmission spectrum, in the waveband 300 to 1200 nanometers.

The graph of FIG. 2 demonstrates that, in the illustrated range of wavelength (corresponding to near infra-red frequencies), there are three pronounced dips in the transmission spectrum. The first is at about 760 nm (just on the verge of visible red light), due to the presence of oxygen. The next is at about 940 nm, due to the presence of water vapour and the third, also due to the presence of water vapour, is at about 1130 nm. It will be appreciated that each dip or region of reduced transmissibility corresponds to a peak or region of increased opacity By illuminating the subject 1 at one more of these wavelengths, or in one or more narrow range of wavelengths substantially centred on these wavelengths, the illumination may be quite clearly discriminated, even at relatively great distances of 3 to 5 meters, and even in bright sunlight. Outside these regions it is difficult to combat the intensity of sunlight and prevent it from saturating the projected pattern.

Thus, the illustrated embodiment may provide the extremely useful advantages of being able to capture and recognise images at relatively large distances (in the context of image recognition) and in virtually any lighting condition.

The pattern projected by the light source 2 can be any suitable pattern. A "speckle" pattern (pseudo-random optical pattern) is often used for object recognition. However, other patterns comprising lines, grids or any predetermined pattern may be used. The processor 4 can make use of patterns to create better (more complete and accurate) 3D images. More than one light source 2 may be used. An alternative light source to a laser may be used—e.g. an LED.

Although the illustrated image recognition system is set up to capture and process 3-D images, and is particularly concerned with recognising images of human faces, other embodiments may capture and process 2-D images and/or images of other subjects. For the capture of 2-D images, a single camera may be used.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all and any priority documents identified in connection with this application and to all and any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or novel combination, of the steps of any method or process so disclosed.

The invention claimed is:

1. A method of forming a 3D image, comprising the steps of illuminating a subject by illumination means and capturing by camera means an image of the subject illuminated by the illumination means:
   wherein:
   the subject is in daylight in an outdoors environment, at a distance of at least 3 meters from the camera means;
   the illumination means comprises a coherent light source and transmits radiation at a single wavelength of 940 nanometers;
   the illumination means projects a pattern onto the subject;
   the camera means comprises at least one camera arranged to capture the components of a 3D image; and
   an image processor receives the image from the or each camera and calculates the 3D image from the or each received image.

2. A method according to claim 1, wherein said subject is at a distance of at least 5 meters from said camera means.

3. A method according to claim 1, wherein said camera means comprises a pair of cameras.

4. A method according to claim 1, wherein said pattern is a speckle pattern.

5. A method according to claim 1, wherein said coherent light source comprises a laser.

6. A method according to claim 1, wherein said subject is a natural subject.

7. A method according to claim 6, wherein said subject is a human subject and said 3D image comprises an image of the subject's face.

8. A method according to claim 1, including the step of comparing the calculated 3D image with a plurality of stored images and producing a recognition result to indicate whether the calculated 3D image exceeds a similarity threshold with at least one of the stored images.

* * * * *